Oct. 1, 1946.    A. R. JACKSON    2,408,649
AIRCRAFT HAVING MOVING AIRFOIL OR WING
Filed May 19, 1944    5 Sheets-Sheet 1
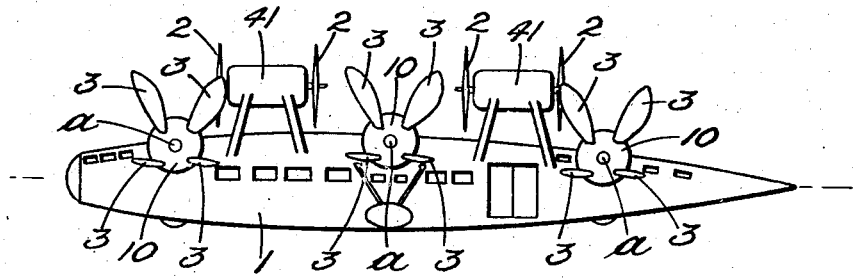
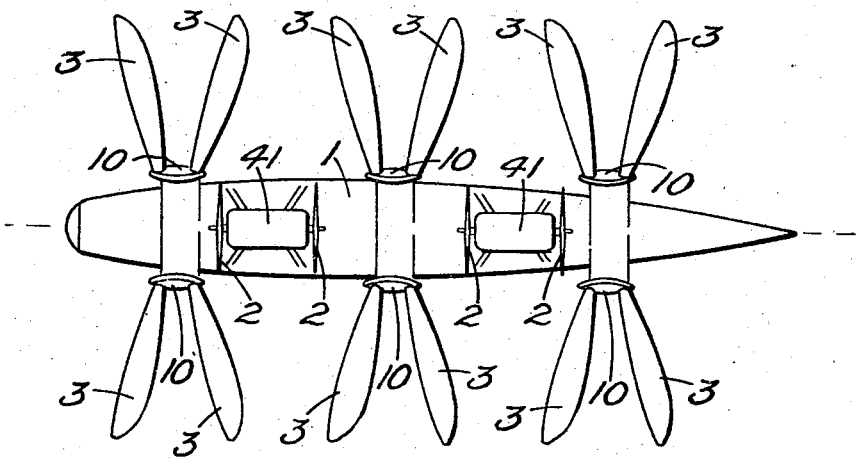
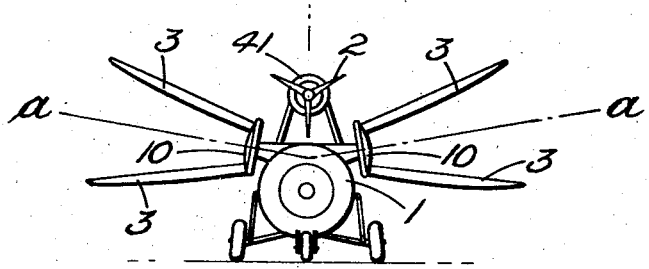

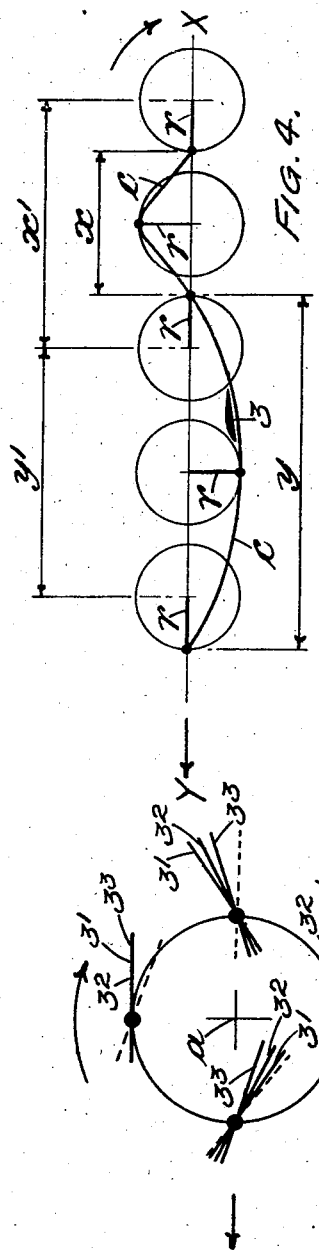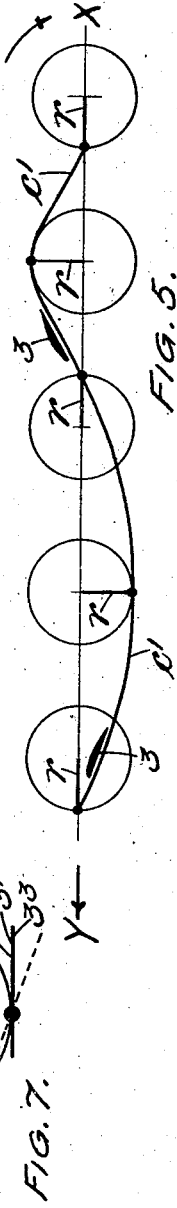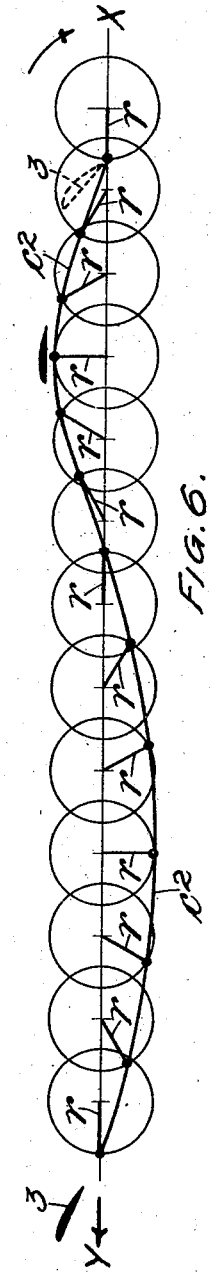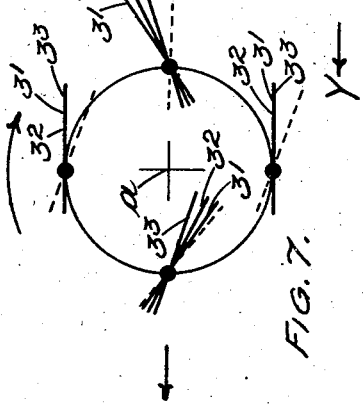

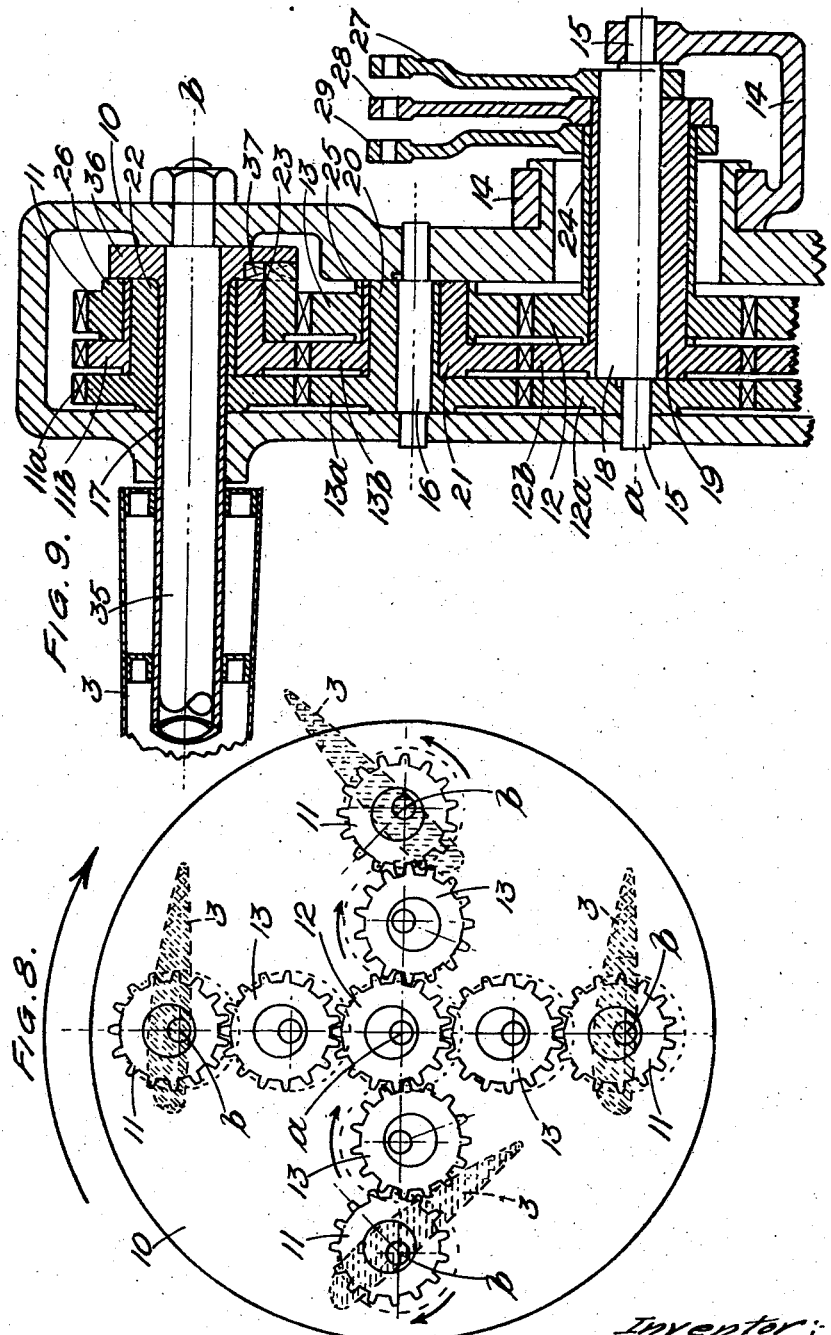

Oct. 1, 1946.  A. R. JACKSON  2,408,649
AIRCRAFT HAVING MOVING AIRFOIL OR WING
Filed May 19, 1944  5 Sheets-Sheet 4
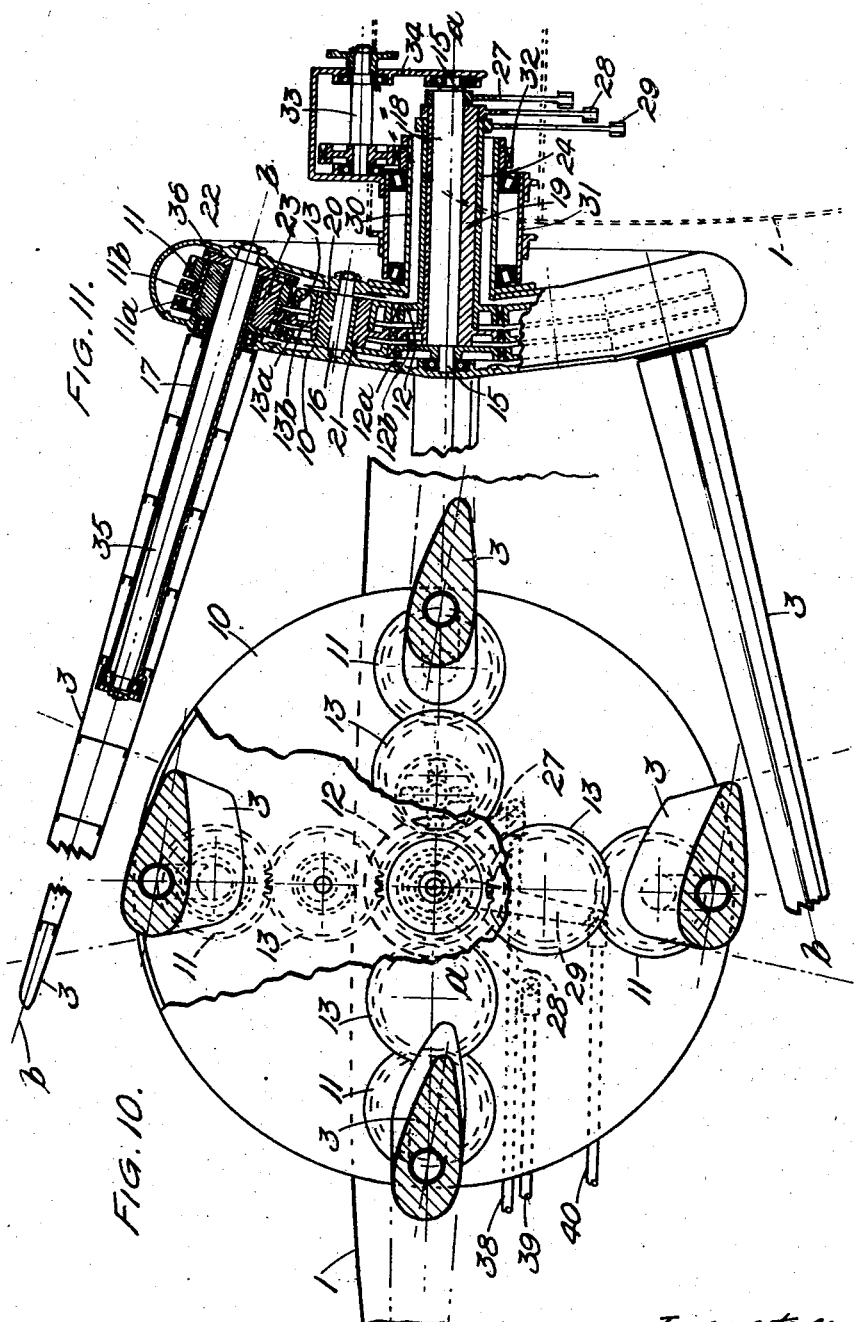

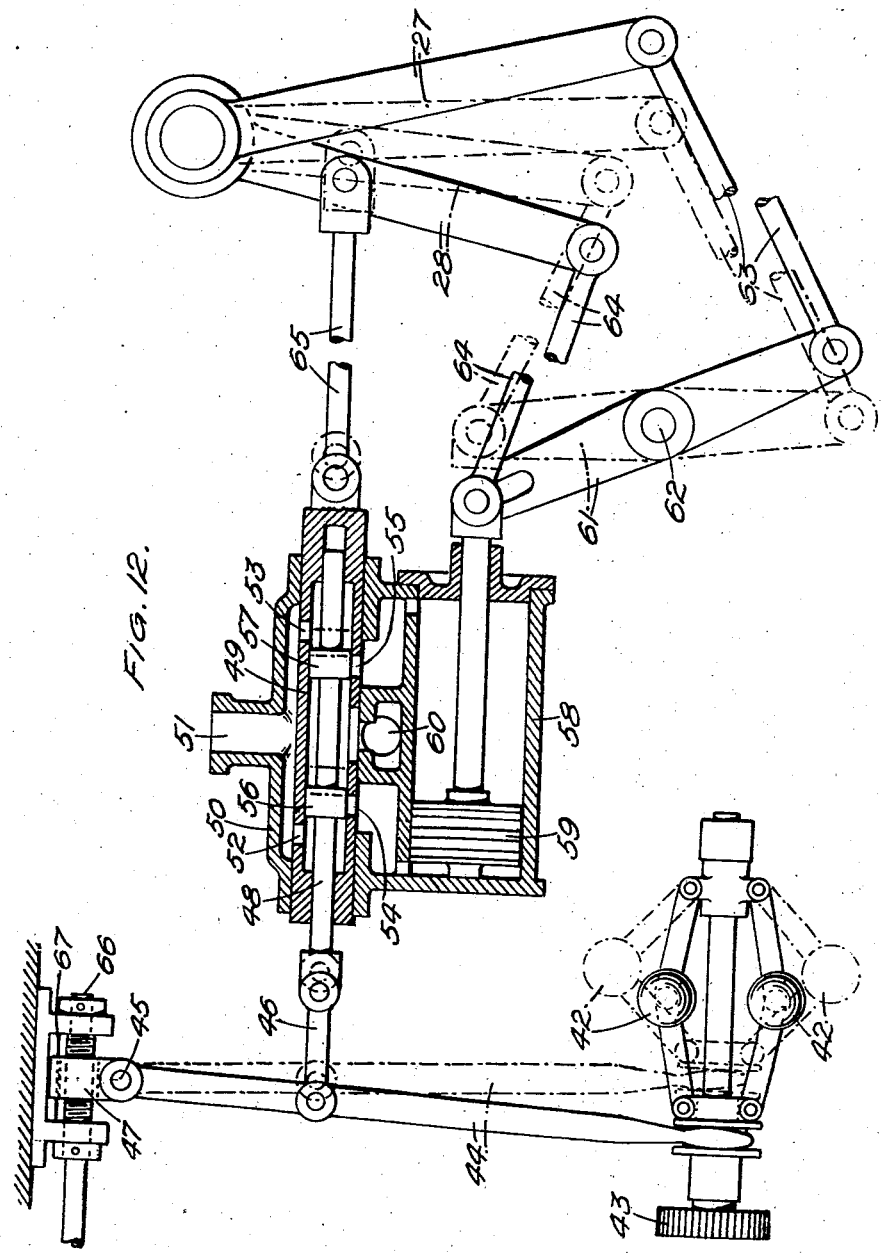

Patented Oct. 1, 1946

2,408,649

UNITED STATES PATENT OFFICE 2,408,649

AIRCRAFT HAVING MOVING AIRFOIL OR WING

Arthur Rex Jackson, Mill Hill, England

Application May 19, 1944, Serial No. 536,364
In Great Britain May 3, 1943

16 Claims. (Cl. 244—21)

This invention relates to aircraft and refers particularly to heavier-than-air aircraft comprising power-operated propulsion means for propelling the aircraft forwardly and wings for maintaining the aircraft airborne. The object of the invention is the provision of an improved heavier-than-air aircraft of this general type, which will have a number of advantages, particularly that of increasing the lift for a given wing area, and also that of obtaining improved control, all as will be more particularly set out hereinafter.

The invention consists broadly of an aircraft comprising power operated propulsion means for propelling the aircraft forwardly, and a plurality of wings for maintaining the aircraft airborne, each of said wings being oscillatable about an oscillation axis transverse of the aircraft, which oscillation axis is itself rotatable about a rotation axis transverse of the aircraft, either all of the wings or groups of them being coupled so as to rotate in unison, and transmission means being provided for correlating the rotary and oscillatory movement of each wing, in such a way that, when the aircraft is propelled by said propulsion means, the reaction of the air against the wings, serves to effect the rotary and oscillatory movement of the wings, with said wings, during such movement, being so inclined to their actual paths of progression in space, that they exercise an upward thrust on the aircraft and serve to keep it airborne.

In order that the invention may be the more clearly understood an aircraft in accordance therewith will now be described, reference being made to the accompanying drawings, wherein:

Figure 1 is a side elevation of said aircraft;

Figure 2 is a plan of the same;

Figure 3 is an end elevation of the same;

Figure 4 is a diagram showing the path of progression of a wing of the aircraft;

Figure 5 is a similar diagram showing said path of progression under different conditions of adjustment;

Figure 6 is a similar diagram showing said path of progression under still different conditions of adjustment;

Figure 7 is a diagram illustrating the angles of the wings of the aircraft at different positions;

Figure 8 is an elevation shown somewhat diagrammatically for the sake of clearness of the mechanism by which the motion of the wings of the aircraft is determined;

Figure 9 is a section, also shown somewhat diagrammatically for the sake of clearness, of a portion of the said mechanism;

Figure 10 is an elevation showing one set of wings of the aircraft and a portion of the fuselage;

Figure 11 is a vertical section of the same;

Figure 12 is a somewhat diagrammatic illustration of apparatus for effecting automatic control of the speed of rotation of the wings of the aircraft.

Referring first to Figures 1 to 3, the aircraft illustrated therein comprises a fuselage 1, four driving propellers 2 for giving forward propulsion, and six sets, each of four vanes or wings 3, for giving the necessary lift.

As shown, the wings 3 extend transversely outwards from the fuselage 1 in a more-or-less horizontal direction, and the four wings of each set are equally spaced, at a common radius, about an axis $a$ to which they are more-or-less parallel. Three sets of the wings are arranged on each side of the fuselage 1 at spaced intervals therealong, the three axes $a$ on the one side being opposite to those on the other side.

The four wings of each set are free to rotate as a whole about the respective axes $a$. Also each wing is capable of oscillating about its own longitudinal axis, and transmission means are provided whereby, as the wings of each set rotate about the axis $a$, the individual wings of said set are caused to oscillate about their own longitudinal axes, one complete oscillation being made to and fro during each complete rotation.

In operation the aircraft is driven forwardly by the propellers 2, and the correlation, between any rotary movement of the sets of wings 3 about the axes $a$ and the consequent oscillating movement of the individual wings about their own axes, is such that the air resistance causes the several sets of wings to rotate and the individual wings therefore to oscillate, the wings at the same time imparting the necessary lift to the aircraft. The forward propulsion may of course be produced by any other agency, as for instance jet propulsion.

In order to explain this function it is necessary to consider the path traversed by a body which is moving at a constant radius around a given axis, while, at the same time, the said axis is moving in a straight line transversely to itself. Thus referring to Figure 4 the curve $c$ shows the path traversed by a body moving in a clockwise direction, at a speed of one unit per second, at a constant radius $r$ around an axis which is progressing from right to left at a speed of 1½ units per second. The straight line X—Y represents the path in which the axis moves and the points on the curve show the successive positions of the body from one 9 o'clock position to the next. This figure is deemed clear and requires no further description.

In like manner, in Figure 5, the curve $c_1$ shows the path traversed by a point moving in a clockwise direction, at a speed of one unit per second, at a constant radius $r$ around an axis which is progressing from right to left along the line X—Y at a speed of two units per second.

Similarly in Figure 6, the curve $c_2$ shows the path traversed by a point moving in a clockwise direction, at a speed of one unit per second, at a constant radius $r$, around an axis which is progressing from right to left along the line X—Y at a speed of three units per second.

These curves $c$, $c_1$ and $c_2$ show that the path in space which the body actually follows is a wave-like path, the upper portions of the waves above the line X—Y being relatively short and steep and the lower portions below the line X—Y being relatively long and flat. Also the curves show that the waves become longer and flatter as the linear speed of the axis increases relative to the circumferential speed of the body about the axis.

It will be seen that, in all these cases, the body is moving horizontally forwards at 12 o'clock and 6 o'clock, and that, at 9 o'clock, it is moving at a maximum angle upwardly whereas at 3 o'clock it is moving at the same angle downwardly. This maximum angle becomes less as the linear speed of the axis increases relative to the circumferential speed of the body.

Considering now the wings 3 as described with reference to Figures 1 to 3, if the correlation of the oscillatory movement of the individual wings about their own axes and the rotary movement of the sets of wings about the axes $a$ is such that the wing sections are horizontal at 12 o'clock and 6 o'clock, whereas at 9 o'clock and 3 o'clock the angles of said wing sections conform to the angles of the curve $c$ at 9 o'clock and 3 o'clock, as indicated by 3' in Figure 7, then if the aircraft were propelled forwardly, each wing would tend to trail, as indicated at 3, in the path of the curve $c$, or, in other words, the sets of wings would rotate, about the axes $a$ at a circumferential speed which is ⅔ of the $a$ at a circumferential speed which is ⅔ of the forward speed of the aircraft. In like manner, if the arrangement is such that the wing sections are horizontal at 12 o'clock and 6 o'clock, whereas at 9 o'clock and 3 o'clock their angles conform to the angles of the curve $c_1$ at 9 o'clock and 3 o'clock, as indicated by $3^2$ of Figure 7, then, if the aircraft were to be propelled forwardly, each wing would tend to trail, as indicated at 3, on the path $c_1$, and the sets of wings would rotate about the axes $a$ at a circumferential speed which is ½ of the forward speed of the aircraft. Similarly if the arrangement is such that the wing sections are horizontal at 12 o'clock and 6 o'clock, whereas at 9 o'clock and 3 o'clock their angles conform to the angles of the curve $c_3$ at 9 o'clock and 3 o'clock, as indicated by $3^3$ of Figure 7, then, if the aircraft were to be propelled forwardly, each wing would tend to trail, as indicated in full lines at 3, in the path $c_2$, and the sets of wings would rotate about the axes $a$ at a circumferential speed which is ⅓ of the forward speed of the aircraft. It will thus be seen that the ratio of the speed at which the sets of wings will move around the axes $a$ to the forward speed of the aircraft depends upon the amplitude of oscillation of said wings.

It will be appreciated that the actual cause of the rotation of the sets of wings about the axes $a$, when the aircraft is moved forwardly, is that the wings are always presented angularly to the airstream in such a way as to create a couple of forces about the axis $a$. Thus the air stream impinging on each wing at 9 o'clock will force it upwards and the air stream impinging on each wing at 3 o'clock will force it downwards, and the wings will thus be set into rotation. The velocity of rotation will continue to increase until a condition is reached where the undulating curved path of the wings closely approximates to the theoretical curves of progression consequent on any predetermined ratio between forward velocity and circumferential velocity and which in turn is governed by the amplitude of oscillation imparted to the wings. When the oscillations are in phase with the curve of progression the rotational speed will remain in fixed relationship with the forward speed of the aircraft the wings then trailing in the directions described by the curves of progression.

It will be seen that, as so far described, as the wings would be substantially trailing in their path of movement they would have no lifting effect upon the aircraft. If, however, the arrangement is such that the wings, while still, as before, being at their limits of oscillation at 3 o'clock and 9 o'clock, have, at 12 o'clock and 6 o'clock a definite angle of incidence to the horizontal as indicated in dotted lines in Figure 7, then it is found that the ratio of the circumferential speed of the sets of wings to the forward speed of the aircraft, still depends solely on the amplitude of oscillation, according to the same law as before, and at the same time the wings have a lifting effect on the aircraft. What actually happens is that the wings still move in the same curve of progression as before according to the amplitude of oscillation, but, instead of trailing in said curve, they always present approximately the same angle of incidence to said curve, and therefore exercise a continuous lifting effort. For example, the dotted lines in Figure 7 show wing angles at 12 o'clock, 3 o'clock, 6 o'clock and 9 o'clock, such that the total amplitude of oscillation, between the limits at 9 o'clock and 3 o'clock, is the same as that required by the curve $c^2$, although the actual angles differ, by the said angle of incidence, from the angles indicated by said curve $c^2$. Therefore, with wing angles as indicated by the dotted lines of Figure 7, when the aircraft is propelled forwardly, the sets of wings will move around the axes $a$ at a circumferential speed of ⅓ of the forward speed, and, at the same time, each wing will exert a continuous lifting effort and the aircraft will become airborne. The relationship of a wing to the curve of progression under these conditions is indicated in dotted lines at 3 in Figure 6. If, while keeping the wing angles to the horizontal the same at 12 o'clock and 6 o'clock (i. e. the angle of incidence), the amplitude of oscillation between the limits at 3 o'clock and 9 o'clock were increased to that indicated by the curve $c_1$ of Figure 5, the sets of wings would move around the axes $a$ at a circumferential speed of ½ the forward speed, and again the wings would maintain the same angle of incidence to the curve of progression and would exercise a continuous lifting effort; and so on. It will be appreciated that, in practice, the circumferential speed will be slightly less than that indicated by the amplitude of oscillation, owing to friction and slip.

In order to bring the revolving wings into exact phase with the curves of progression provision can be made to boost up the speed of revolution by applying power. The application of such power is however quite incidental to the practical working of the wings and is simply introduced as a means for added efficiency, particularly when the machine is taking off from the ground.

As will appear hereinafter means are provided whereby the amplitude of oscillation between the limits at 3 o'clock and 9 o'clock can be varied, to thereby vary the ratio of the circumferential speed of movement of the wings around the axes $a$ to the forward speed of movement of the aircraft; and means are also provided whereby the angle of incidence of the wings can be varied to vary the lifting effort.

As heretofore stated, it is one of the objects of the present invention to reduce the forward velocity of the aircraft required, in relation to the total wing area, to render said aircraft airborne. The lift of a wing varies as the square of its velocity through the air. From an examination of any of the curves $c$, $c1$, $c2$ of Figures 4 to 6, it will be seen that the path of progression of a wing 3 in accordance with the present invention is considerably longer than the straight path along which the aircraft moves. Therefore the average air speed velocity of a wing in accordance with this invention must be greater than the average air speed velocity of a wing which is rigidly attached to the aircraft in the ordinary way, and a greater lift per unit area is therefore to be expected. Moreover, in the unit of time indicated by $x'$ Figure 4 the wing 3 has moved through a curve over the dimension $x$, whereas in the second unit of time indicated by $y'$ said wing has moved, at a very much higher velocity, through the much longer curve over the dimension $y$. The average of the squared velocities per second over these two units of time show that on the curved path followed by the wing to be more than 40% greater than that on the straight path followed by the aircraft. Thus, in the present invention, with the wings arranged to operate according to the curve $c$ of Figure 4, a lift is to be expected of more than 40% greater per unit area of wing, at any given forward speed, than is the case with an ordinary aeroplane moving at the same forward speed.

In this connection it is to be noted that the lift per unit area which will be given with the wings arranged to operate according to the curve $c$ of Figure 4, is greater than that given with the wings arranged to operate according to the curve $c1$ of Figure 5, while the lift given with the wings arranged to operate according to the curve $c2$ of Figure 6 will be still less. This is because curve $c$ differs from the straight line more than curve $c1$ and still more than curve $c2$, and also because the ratio of the part $y$ to the part $x$ of the curve is greater in the case of curve $c$ than in the case of curve $c1$ and still more than in the case of curve $c2$. Therefore the average of the velocities squared will be greatest in the case of curve $c$ less in the case of curve $c1$ and least in the case of curve $c3$ for any given forward speed.

In other words the greater the amplitude of oscillation the greater the lift, the angle of incidence being assumed the same. Therefore, at taking off, the angle of oscillation and the angle of incidence are both set at a maximum. When the aircraft is airborne the amplitude of oscillation is reduced and the angle of incidence may also be reduced. As the amplitude of oscillation is reduced, the circumferential speed at which the wings 3 move around the axis $a$ is reduced relative to the forward speed, and the actual path of movement of the wings is flattened. More particularly, at take off speeds the circumferential velocity of the wings may be of the order of 40 feet per second with an aircraft speed of 60 feet per second. At high speeds the circumferential velocity might be 10 feet per second against an aircraft speed of 400 feet per second. Under this latter condition the actual path followed by each wing would flatten out to something approximating to a straight line and the wings would function in a manner very similar to ordinary rigid wings. In fact by reducing the amplitude of oscillation to zero, the wings could be brought completely to circumferential rest and thus become, in effect, fixed wings.

It will thus be appreciated that, unlike other rotating wing conceptions, helicopters, autogyros and the like, the essential characteristic of stable flight is preserved at all speeds inasmuch as the wings are always moving through the air in the direction of flight, and thus there is no artificial limit to forward velocities.

Another advantage of the invention is that it provides a large number of lifting surfaces instead of the lift being concentrated, as with conventional monoplane design. Multirigid wing aircraft have been proposed but have proved to be aero-dynamically less efficient than monoplanes owing to the fact that the upper planes interrupt the air stream passing over the lower planes and thus reduce the lift. Such interference will be considerably reduced in a rotating wing aircraft according to the present invention, since the relationship between the wings is not fixed as with conventional bi-planes or tri-planes. Moreover, the formation of lift disturbing eddies, which invariably occur when a rigid wing is drawn through the air and which cause stalling at a relatively low angle of incidence, will be smoothed away by oscillating action of the wings. The formation of air eddies is in part due to the fact that a fixed rhythm of conditions is imposed by a rigid wing, which sets up recurring cycles of air frictional reactions adjacent to the surface of the wing. The continuity of the rhythm is broken, in the present invention, by the oscillations of the wings, with a result that larger angles of incidence may be employed without stalling, and thus the invention contributes still further to the lift which may be applied at take off. Again the multiplicity of lifting surfaces available with a plurality of rotating assemblies, as in the present arrangement, will afford very wide latitudes in aircraft design, whereas the rigid wing principle imposes fixation, in that the centre of gravity of the aircraft, including its load, must closely coincide with the one centre of pressure of the wing lifting surfaces.

It now remains to describe the preferred transmission means by which the wings 3 may be caused to oscillate, in the manner described, about their individual axes, as the sets of wings are rotated around the axes $a$, which transmission means may be actuated to vary the amplitude of oscillation between the extremes at 3 o'clock and 9 o'clock and also to vary the angle of incidence.

Thus referring to Figure 8, which illustrates somewhat diagrammatically the four wings 3 of one set, together with the mechanism by which said wings are caused to oscillate when rotated, a carrier member 10 is provided which rotates about the axis $a$ of the set. This carrier member 10 has mounted on it, with their longitudinal axes $b$ at equal radii, and at equal angular spacing, with respect to the axis $a$, the four wings 3. These wings 3 are mounted on said carrier member 10 so as to be capable of rotating about their axes $b$, and each wing is coupled, in respect of rotary movement, to a gear wheel 11 which is also capable of rotating about the respective axis $b$. Located at the region of the axis $a$ is a sun wheel 12 which is fixed, and is not carried by the rotating carrier member 10, and this sun wheel 12 is in train with each of the gear wheels 11 through the medium of idler gear wheels 13 rotatably mounted on the carrier member 10. All the gear wheels have the same number of teeth, and it will be readily apparent that, if the sun wheel 12 were mounted with its centre coincident with the axis $a$, and if the gear wheels 13 and 11 were all concentrically rotatable, each idler wheel 13 having its centre in line between the centre of the sun wheel 12 and the centre of the respective wing-operating wheel 11, said wing-operating wheels 11, upon rotation of the carrier member 10 about the axis $a$, would remain with their rotary orientation unchanged so that the wings 3 would make no oscillation about their longitudinal axes $b$, but would remain at a constant angle.

In order to cause said wings 3 to oscillate as heretofore described, when the carrier member 10 is rotated around the axis $a$, the sun wheel 12 is mounted so that the axis $a$ is eccentric with respect to the centre of said sun wheel, and the axis about which each of the wheels 13 and 11 is rotatable is similarly eccentric with respect to the centre of said wheel, the degree of eccentricity in all cases being the same. As will be seen from Figure 8 the centre of the sun wheel 12 is vertically above the axis $a$, and, at 6 o'clock and 12 o'clock the centres of the wheels 13 and 11 will be similarly vertically above their axes of rotation. With this arrangement it will be found that, as the carrier member 10 is rotated about the axis $a$ the gear wheels will all remain in mesh, and the wing-carrying gear wheels 11, and therefore the wings 3, will oscillate between extreme positions at 3 o'clock and 9 o'clock. That is to say, they will oscillate as heretofore described. In Figure 8, the coupling of the wings 3 to the wing-operating gear wheels 11 is, for the sake of simplicity, shown to be such that the wing sections are horizontal at 12 o'clock and 6 o'clock and are upwardly inclined at 9 o'clock and downwardly inclined at 3 o'clock. In other words there is no angle of incidence and the wings would simply trail on a curve such as $c$, $c1$, $c2$ if the aircraft were moved through the air, without affording any lift. The means by which the angle of incidence is adjusted will be described hereinafter.

In order that the eccentricity of the gear wheels 11, 12 and 13 shall be capable of being varied, to thereby vary the amplitude of oscillation of the wings 3, three complete sets of gear wheels are provided, as best shown in Figure 9. This figure shows the stationary sun gear wheel 12, one wing operating gear wheel 11, and the intermediate corresponding idler gear wheel 13. Said figure also shows two additional stationary sun gear wheels 12$a$ and 12$b$, two additional idler gear wheels 13$a$ and 13$b$ in mesh with the respective sun wheels 12$a$ and 12$b$, and two additional gear wheels 11$a$ and 11$b$ in mesh with the respective idler wheels 13$a$ and 13$b$. The reference 14 designates the fixed part in which the rotating carrier member 10 rotates. The arrangement is as follows:

The sun wheel 12$a$ is rigidly and concentrically mounted on a shaft 15 which is concentric with the axis $a$ about which the carrier member 10 rotates. One end of this shaft bears in the fixed part 14 and the other bears in the carrier member 10. The idler gear wheel 13$a$ is mounted concentrically on a shaft 16 whose ends bear in the carrier member 10, and the gear wheel 11$a$ is mounted concentrically on a shaft 17 mounted, as will hereinafter appear, on said carrier member 10.

The shaft 15 of the sun wheel 12$a$ is formed with an eccentric boss 18. The sun wheel 12$b$ is formed with a larger boss 19 which is concentric with said sun wheel, and this boss 19 has an eccentric bore hole, the radius of eccentricity of which is the same as that of the boss 18. As shown the boss 18 bears in the bore hole of the boss 19.

In like manner the idler wheel 13$a$ is formed with an eccentric boss 20. The idler wheel 13$b$ is formed with a larger boss 21 which is concentric with said idler wheel, and said boss 21 has an eccentric bore hole, the radius of eccentricity of which is the same as that of the boss 20. As shown the boss 20 bears in the bore hole of the boss 21.

In like manner the wheel 11$a$ is formed with an eccentric boss 22. The wheel 11$b$ is formed with a larger boss 23 which is concentric with said wheel 11$b$ and said boss 23 has an eccentric bore hole, the radius of eccentricity of which is the same as that of the boss 22. As shown the boss 22 bears in the bore hole of the boss 23.

Finally the sun wheel 12 has a boss 24 with a concentric bore hole in it in which bears the boss 19 of the sun wheel 12$b$. The idler wheel 13 has a boss 25 with a concentric bore hole in it in which bears the boss 21 of the idler wheel 13$b$. The wing-operating wheel 11 has a boss 26 with a concentric bore hole in it in which bears the boss 23 of the wheel 11$b$.

The three bosses 18, 19 and 24 have respective radial arms 27, 28 and 29 rigidly mounted on them by which said bosses can be rotatably adjusted.

Figure 9 is a plan illustrating the condition at say 9 o'clock. As heretofore described the wheel 12$a$ is permanently concentric with the axis $a$ and the wheels 13$a$ and 11$a$ are always concentric with their axes of rotation. With the adjustment of the levers 27 and 28 as illustrated, the sun wheel 12$b$ is also concentric with the axis $a$, since the radius of eccentricity of the boss 18 is diametrically opposite to the radius of eccentricity of the bore hole in the boss 19. But since the gear wheels 12$a$, 13$a$ and 11$a$ are in mesh, and the gear wheels 12$b$, 13$b$ and 11$b$ are in mesh, the radius of eccentricity of the boss 20 is diametrically opposite to the radius of eccentricity of the bore in the boss 21, and the radius of eccentricity of the boss 22 is diametrically opposite to the radius of eccentricity of the bore in the boss 23. These diametrically opposite relationships will remain unchanged throughout the rotation of the carrier member 10.

Therefore the wheels 13$b$ and 11$b$ will also be concentric with their axes of rotation. Also since the sun wheel 11 is always concentric with the sun wheel 11$b$, said sun wheel 11 at the adjustment illustrated will also be concentric with the axis $a$ and, since the wheels 13 and 11 are always concentric with the wheels 13b and 11b said wheels 13 and 11 are also, at the adjustment shown, concentric with their axes of rotation.

Thus, at the adjustment illustrated, all the gear wheels being concentrically mounted and the sun wheels being stationary, when the carrier member 10 is rotated about the axis $a$ the idler wheels will roll round the sun wheels, and the wheels 11a, 11b and 11 will move round the axis $a$ without changing their orientation, and the wings 3, being coupled, as will hereinafter appear, to the wheels 11, would also move round the axis $a$ without changing their angle.

If now either of the levers 27 or 28 is moved to rotatably adjust either of the respective bosses 18 or 19, the angular relationship of the radii of eccentricity of the boss 18 and the bore hole in the boss 19 will no longer be 180°, and the sun wheel 12b will therefore become eccentric to the axis $a$. And since the gear wheels 12a, 13a and 11a are in mesh, and the gear wheels 12b, 13b, and 11b, are in mesh, the angular relationship of the radii of eccentricity of the boss 20 to the hole in the boss 21, and of the boss 22 to the hole in the boss 23 will also be varied from 180° in the same way, and the gear wheels 13b and 11b will also be eccentric to the same degree as the sun wheel 12b. Obviously the wheels 12, 13 and 11 will take the same eccentricity as the wheels 12b, 13b and 11b.

As heretofore explained, it is normally required that the radius of eccentricity of the sun wheel 12 should be at 12 o'clock. This condition can obviously be attained by the correct relative adjustment of the levers 27 and 28. For example, assuming as stated that Figure 9 is a sectional plan illustrating the conditions at 9 o'clock, if the lever 27 is moved through a given angle towards the reader and the lever 28 is moved away from the reader through the same angle, the sun wheel 12 will be given an eccentricity, depending upon the said angle, and the radius of that eccentricity will be at 12 o'clock. When it is desired to make the radius of eccentricity of said sun wheel 12 away from 12 o'clock this can obviously be done by giving the opposite angles of adjustment of the levers 27 and 28 different values. This would have the effect of putting the oscillations of the wings 3 out of phase with respect to the curve of progress as illustrated in Figures 4 to 6.

It will have been observed that the gears 12, 13 and 11 have always the same eccentricity as the gear wheels 12b, 13b and 11b. However if the wings had been secured to the gear wheels 11b instead of to the gear wheels 11 the angle of incidence of said wings (i. e. their mean angle with respect to the actual curve of progression shown in Figures 4 to 6) would have been invariable. By providing the third gear train 12, 13, 11 as described, and coupling each wing to a gear 11 it is possible to adjust the angle of incidence of the wings. Thus, by rotatably adjusting the lever 29, the boss 24, and therefore the sun gear 12 is rotatably adjusted and this effects the adjustment of the rotary position of the wing-operating wheel 11, at any given angular position about the axis $a$. In other words it adjusts the angle of incidence of the wing.

Figures 8 and 9 have been somewhat simplified in order to show the working of the invention the more clearly. Figures 10 and 11 show, in elevation and section, a practical arrangement of one set of four wings 3. In these figures the same reference characters are used as in the preceding figures. It will be seen that the rotating carrier member 10 takes the form of a hollow drum-shaped casing in which the gear wheels are all mounted. This casing 10 has a central tubular extension 30 which bears in roller bearings in a fixed outer sleeve 31 which corresponds to the part 14 of Figure 9. Said extension 30, beyond the roller bearings carries a gear wheel 32 which is in mesh with a pinion carried on a shaft 33 mounted as shown on a bracket 34 which is rigidly attached to the fixed outer sleeve 31, and which, incidentally, serves to support the bearing for one end of the shaft 15. This shaft 33 is coupled by some form of transmission mechanism, not shown, to the corresponding shaft 33 appertaining to the opposite set of wings on the other side of the aircraft, and thus it is ensured that opposite sets of wings will always rotate at the same speed as each other and will preserve rotary phase equality with each other. If desired the pairs of opposite sets of wings could also be coupled together to ensure that all the sets of wings rotate at the same speed and preserve phase equality. However, this is not a necessity, and it may be found preferable not to couple even the opposite sets of wings.

As shown in Figures 10 and 11, and also in Figures 1 to 3, the longitudinal axes $b$ of the wings 3 of each set diverge slightly with respect to the axis $a$. Also, as shown in Figures 1 to 3, the axes $a$ themselves are inclined slightly upwardly from the fuselage. To provide for this divergence of the longitudinal axes of the wings 3, the gear wheels are all formed with a slight bevel so that the axes of the gears 11a, 11b and 11 are parallel to the required longitudinal axes $b$ of the respective wings 3.

The previously mentioned shaft 17 on which the gear wheel 11a is mounted is hollow and bears on a rod 35 which is fixed to the casing 10. This hollow shaft 17 forms the means for attaching the wing 3 to the gear 11. Thus said wing is mounted fixedly on said shaft 17 with its longitudinal axis $b$ in coincidence with the axis of said shaft, and said shaft is formed with a head or flange 36 which is coupled to the gear 11. The coupling between said gear 11 and said flange 36 must be a keyed or splined connection as indicated at 37 (Figure 9) in order that the gear 11 can rotate eccentrically, while the shaft 17 rotates concentrically, with respect to the centre of said shaft. As shown the shaft 17 and rod 35 are extended a considerable distance from the carrier member 10 in order to afford the necessary strength for supporting the wing.

The references 38, 39 and 40 designate transmission rods by which the levers 27, 28 and 29 are actuated.

It will be appreciated that, in the adjustment shown in Figures 10 and 11, the gears are set for zero oscillation of the wings 3 and zero angle of incidence. With this adjustment, which of course is not an adjustment which would ever be employed in practice, the wing sections would all be horizontal as shown for all rotary positions of the carrier member 10.

Returning to Figures 1 to 3, it will be seen that the driving propellers 2 together with their motors 41 are shown on top of the fuselage 1 arranged in tandem fashion. By making the axes $a$ of the sets of wings upwardly inclined as stated, and making the individual axes of the wings divergent with respect to the axes $a$ the longitudinal axes of the wings 3 are included upwardly at a considerable angle at the 12 o'clock position, and are inclined downwardly at only a slight angle at the 6 o'clock position. Thus greater lateral stability is imparted to the aircraft as is well understood.

In practice the whole of the flight control is preferably effected solely through the manipulation of the wings 3, tail fins and rudder not being required.

A turn is accomplished, first by increasing the drag ratio of the wings 3 on the inner side of the curve of the desired turn, and subsequently by increasing the lift ratio of the wings on the outer side of said curve, so as to bank the machine. The drag ratio is increased by throwing the oscillations of the wings out of phase with the actual curves of progression as heretofore described. The lift would be increased by increasing the angle of incidence.

Automatic control is contemplated to keep the sets of wings revolving at a predetermined speed, and a control mechanism for this purpose is illustrated in Figure 12. Referring to this figure, the same illustrates a set of governor balls 42 coupled by means of a gear wheel 43 to the shaft 33 and adapted to control the two levers 27 and 28. If at any time the forward speed of the aircraft increases, the speed of rotation of the set of wings, and therefore of the shaft 33 will commence to increase, and this will cause the governor balls 42 to spread in the direction towards the dotted line position. This causes the two levers 27 and 28 to move in the direction towards the dotted line position, thereby decreasing the amplitude of oscillation of the wings. This causes the speed of rotation of the wings relative to the forward speed of the aircraft to decrease, and thus the actual speed of rotation of the wings remains constant within given limits. In the event of a decrease in speed of the aircraft, the mechanism operates in the reverse direction to increase the speed of rotation of the wings relative to the aircraft speed, and, again, the actual speed of rotation remains constant within limits.

Obviously if the sets of wings are all coupled together, only one such mechanism will be required, and the several pairs of levers 27, 28 will be coupled so as to act in unison. If the sets of wings revolve independently a control mechanism will obviously be required for each set.

Describing now more particularly the operation of the apparatus, when the balls 42 spread, the lever 44 pivoted at 45 will move in the direction towards the dotted line position. This lever is coupled, by means of a link 46 to a piston valve 48 which moves longitudinally in a sleeve 49 which in turn is movable longitudinally in an outer stationary valve casing 50. Liquid at pressure flows through a port 51 in said casing 50 and flows through ports 52 and 53 into the interior of the sleeve 49 at each end, but normally said liquid is prevented from passing through ports 54 and 55 by lands 56 and 57 on the valve 48. When, however, the lever 44 moves towards the dotted line position the valve 48 moves to the right and the land 56 partly uncovers the port 54 thereby allowing pressure fluid to flow through said port 52 and into the left hand end of a cylinder 58. Thus pressure liquid is applied to the left hand side of the piston 59 in said cylinder. At the same time the land 57 partly uncovers the port 55 thereby connecting the right hand end of said cylinder 58 to an exhaust port 60 which is permanently in communication as shown with the part of the sleeve between the lands.

The piston 59 therefore moves to the right and thereby rotates, in the direction towards the dotted line position, a lever 61 pivoted at its midpoint 62 and connected at one end to the piston rod of the piston 59 by a pin and slot connection as shown. One end of said lever is connected by means of a link 63 to the lever 27 and the other end is connected by means of a link 64 to the lever 28, and thus, as will be clear from the drawings, the arrangement is such that, as the lever 61 moves, in the direction towards the dotted line position, the levers 27 and 28 will simultaneously move in opposite directions towards the dotted line positions.

In the arrangement shown the lever 28 is coupled, by means of a link 65, to the sleeve 49, so that, as said lever moves towards the dotted line position, said sleeve is moved to the right and thereby causes the ports 54 and 55 to be again cut off by the lands 56 and 57. Thus so-called position control, and not floating control, is obtained the levers 27 and 28 having a given position for each speed of rotation of the wings.

The automatic control effected by the apparatus of Figure 12 can be varied within predetermined limits by the pilot. Thus the part to which the lever 44 is actually pivoted at 45 is a block 47 in screwed relation on a screwed rod 66 approximately parallel to the link 46, and having one end slidably keyed in a fixed slot 67 also parallel to the link 46. As will be clear from the drawings the rod 66 is capable of rotary but not of longitudinal movement, and it will be seen that rotation of said rod 66 in opposite directions will effect movement of the block 47 in opposite directions parallel to the link 46. Thus by rotation of said rod 66 the position of the valve 48 for a given position of the governors can be varied, or, in other words, the speed of wing rotation for which the apparatus is set can be varied. The rotation of said rod 66 is adapted to be effected by the pilot, and thus the pilot can, at will, vary, within limits, the speed of wing rotation for which the apparatus is set.

The invention also contemplates the provision of automatic control, through gyro-hydraulic mechanism, for keeping the aircraft on a level keel. Thus, if the front part of the machine tended to rise, the automatic control would come into operation slightly to decrease the lift of the forward wings.

The general stability of the machine in flight would thus be under automatic control and the aircraft would be automatically trimmed if load displacement occurred. Considerable load displacement would be possible, which is not the case with a conventional aircraft which must keep the load trimmed within narrow limits.

What I claim and desire to secure by Letters Patent is:

1. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, and means for adjusting said transmission means to vary the inclination of the wing operated thereby to its path of progression, whereby the upward thrust applied thereby to the aircraft is variable.

2. An aircraft as defined in claim 1 wherein said transmission means are further adjustable to also vary the amplitude of oscillation of the wing to thereby vary the speed of rotation of the wing relative to the forward speed of the aircraft.

3. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, and means for adjusting said transmission means to vary the amplitude of oscillation of the wing operated thereby to vary the speed of rotation thereof relative to the forward speed of the aircraft.

4. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, means for adjusting said transmission means to vary the amplitude of oscillation of the wing operated thereby to vary the speed of rotation thereof relative to the forward speed of the aircraft, and means for automatically controlling said amplitude adjusting means to maintain the absolute speed of rotation of the wing associated therewith substantially constant.

5. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne and arranged to make one complete oscillation to and fro during each rotation, the limits of oscillation occurring approximately at the 3 o'clock and the 9 o'clock positions, and the arrangement being such that each wing is inclined to the horizontal with its forward edge upwards of the 12 o'clock and the 6 o'clock positions.

6. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, means for adjusting said transmission means to vary the amplitude of oscillation of the wing operated thereby to vary the speed of rotation thereof relative to the forward speed of the aircraft, and means for varying the phase of the oscillations of each wing with respect to the phase of its rotation.

7. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, said wings being arranged in sets with the individual oscillation axes rotatable as a unit about a common axis of rotation and the sets of wings extending outwardly on opposite sides of the aircraft with the individual wings supported at their inner ends only.

8. An aircraft according to claim 7, wherein the common rotation axis of each set is inclined to the horizontal in a direction upwardly from the aircraft.

9. An aircraft according to claim 7, wherein the oscillation axis of each wing is inclined with respect to its rotation axis in a direction divergently from the aircraft.

10. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, said wings being arranged in sets with the individual oscillation axes rotatable as a unit about a common axis of rotation and the sets of wings comprising a plurality of sets extending outwardly on each side of the aircraft and spaced therealong.

11. In an aircraft, in combination, means for propelling the aircraft, a plurality of wings for maintaining the aircraft airborne, means for mounting each wing for oscillation about an axis transverse to the aircraft and for rotation about another axis transverse to the aircraft, coupling means interconnecting said wings to cause rotation thereof in unison, transmission means correlating the rotary and oscillatory movement of each wing in such manner that the reaction of the air against the same resulting from movement of the aircraft caused by said propelling means effects both rotary and oscillatory movement thereof, each wing being inclined to its path of progression in space to exert an upward thrust on the aircraft to keep it airborne, said wings being arranged in sets with the individual oscillation axes rotatable as a unit about a common axis of rotation and the sets of wings extending outwardly on opposite sides of the aircraft with the individual wings supported at their inner ends only, the wings of each set being mounted, so as to be oscillatable, about their respective oscillation axes, on a common carrier member rotatable about the common rotation axis, and the transmission means, for correlating the rotary and oscillatory movement of the wings, comprising a stationary sun gear wheel mounted with its centre eccentric with respect to the common rotation axis, oscillation gear wheels, having the same number of teeth as the sun wheel, rotatably mounted on said carrier member, with their centres eccentric with respect to their axes of rotation, their eccentricity being the same as that of the sun wheel, and idler gear wheels, also having the same number of teeth as the sun gear wheel, rotatably mounted on said common carrier member, in mesh between the respective oscillation gear wheels and the sun gear wheel, said idler gear wheels also having their centres eccentric with respect to their axes of rotation their eccentricity being the same as that of the sun wheel, said oscillation gear wheels being coupled to the respective wings to effect oscillation thereof.

12. An aircraft according to claim 11, wherein the variation of the amplitude of oscillation of the wing of each set is effected by simultaneously varying the radius of eccentricity of the sun gear wheel, the idler gear wheels and the oscillation gear wheels.

13. An aircraft according to claim 11, wherein the variation of the phase of the oscillation of the wings of each set with respect to the phase of the rotation of the wings thereof is effected by varying the angular position of the radius of eccentricity of the sun gear wheel and simultaneously bringing the angular positions of the radii of eccentricity of the idler and the oscillation gear wheels into conformity to that of the sun gear wheel.

14. An aircraft according to claim 11, wherein the variation of the inclination of the wing of each set to their actual paths of progression is effected by varying the actual angular position of the sun gear wheel independently of the angular position of its radius of eccentricity.

15. An aircraft according to claim 11, wherein said sun gear wheel, idler gear wheels and oscillation gear wheels are mounted concentrically with, and so as to be rotatable with respect to, the sun gear wheel, idler gear wheels and oscillation gear wheels of a second similar set, and the sun gear wheel, idler gear wheels and oscillation gear wheels of said second set are rotatably mounted eccentrically on parts of the sun gear wheel, idler gear wheels and oscillation gear wheels of a third similar set which parts are also eccentric to the same degree, with respect to said gear wheels of said third set, the sun gear wheel of said third set being rotatably mounted concentrically with the common rotation axis, and the idler gear wheels and oscillation gear wheels of said third set being concentrically rotatably mounted on said carrier member, and means being provided for adjusting the rotary position of all three sun gear wheels independently.

16. An aircraft according to claim 10, wherein opposite sets of wings are coupled together so that they rotate in unison about their respective common rotation axes.

ARTHUR REX JACKSON.